A. & J. EXTON.
Cracker-Machine.
No. 164,282.
Patented June 8, 1875.
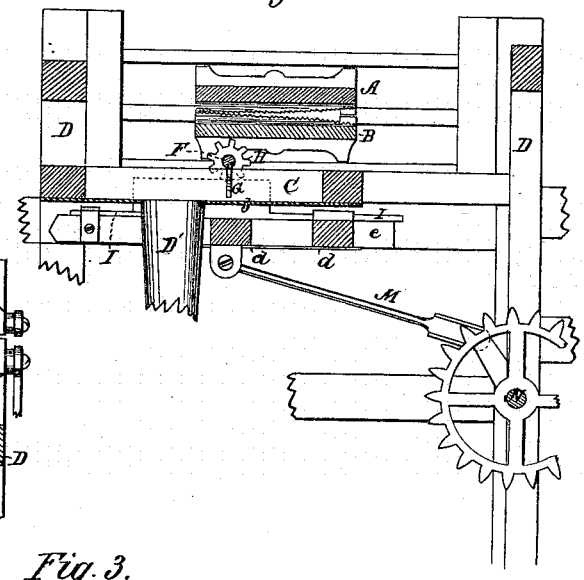
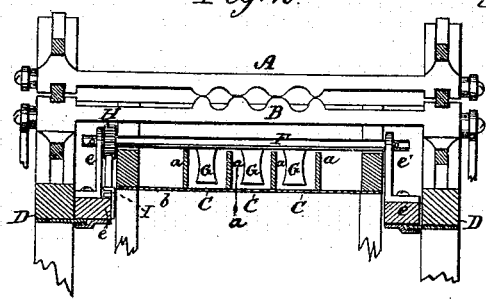
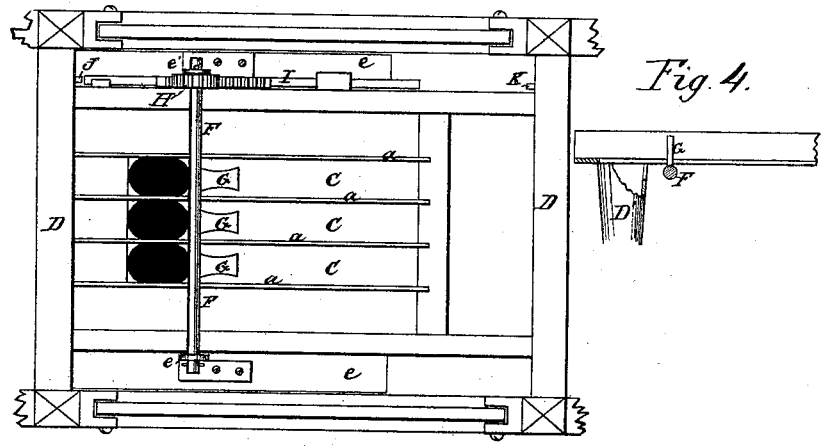
WITNESSES:
W. W. Hollingsworth
Amos W. Cart
INVENTORS:
Adam Exton
John Exton
BY
ATTORNEYS.

UNITED STATES PATENT OFFICE.

ADAM EXTON AND JOHN EXTON, OF TRENTON, NEW JERSEY.

IMPROVEMENT IN CRACKER-MACHINES.

Specification forming part of Letters Patent No. 164,282, dated June 8, 1875; application filed March 30, 1875.

CASE B.

*To all whom it may concern:*

Be it known that we, ADAM EXTON and JOHN EXTON, of Trenton, in the county of Mercer and State of New Jersey, have invented a new and useful Improvement in Cracker-Machines; and we do hereby declare that the following is a full, clear, and exact description of the same, reference being had to the accompanying drawing, forming a part of this specification, in which—

Figure 1 is a sectional elevation of our transferring apparatus for cracker-machines. Fig. 2 is a cross-section on line *x x*, Fig. 1. Fig. 3 is a top-plan view of the apparatus, the grooved molding-plates shown in Fig. 1 being removed.

The object of this invention is to furnish an improved means for conveying or transferring crackers from the molding to a docking and finishing apparatus; and it consists in a horizontally-reciprocating rock-shaft, provided with radial arms or fingers, which work in parallel grooves or channels formed in the hopper under the molding-plates, and serve to push or roll the molded crackers along to the tubes or passages, by which they are conducted to the docking apparatus, as hereinafter fully described.

In another patent of like date we have given a general description of a cracker-machine, of which the hereinafter-described transferring apparatus forms an essential part.

A and B indicate the grooved and oppositely-reciprocating plates, by which the dough is molded into oblate spheroidal shapes, and delivered into the parallel channels C. These channels are formed by vertical partitions *a* and a horizontal bottom piece, *b*, firmly secured in the frame D of the machine. The tubes D', by which the molded crackers are delivered to the rolling and docking apparatus, (not shown,) open into the channels through the bottom *b*, as shown. A sliding reciprocating frame, E, composed of parallel side bars *e* and cross-bars *d*, is arranged beneath the trough-bottom *b*, and supported in ways formed by plates attached to the frame D. A cross-shaft, F, is journaled in vertical standards *e'*, which are attached to the side bars *e* of frame E. Said shaft has a series of radial arms or fingers, G, which are spaced correspondingly to the width of the ways or troughs C, so as to work therein, as hereinafter described. A pinion, H, is keyed on one end of the shaft, and meshes with a rack-bar, I, which rests and slides on one of the side bars *e* of frame F. The ends of the rack-bar which extend beyond its toothed portion work in suitable guides or keepers, and come alternately in contact with stops J and K, attached to the frame D.

Our preferred and illustrated means of reciprocating the frame E are a crank-shaft, N, and connecting-rod M. The rack-bar I moves with the frame E in its reciprocation until arrested and held stationary by stop J or K. The effect of thus arresting the rack-bar, and at the same time continuing the movement of the frame E, is to cause the pinion H to make a quarter-revolution, which causes the fingers G to turn down into the channels C or to rise out of them, according as the shaft is at one end or the other of its horizontal reciprocating movement.

By the above-described construction and arrangement of parts it will be seen that when a batch of molded crackers have been delivered by the plates A B into the ways or channels C the frame E is about reaching the limit of its movement to the right, as seen in drawing; and, the rack-bar being arrested, as above described, the shaft revolves sufficiently to cause its fingers to take into the channels, upon which the frame E at once begins its return movement. The fingers being thus held vertical and stationary in the channels while the shaft moves with the frame E, they push or roll the crackers along therein till they drop by their own gravity into the tubes, when, the rack-bar being arrested as before, the shaft rotates backward till the fingers assume a horizontal position in readiness to allow the shaft to be again moved to the right, and thereby repeat the operation.

We show in Fig. 4 another arrangement of the rock-shaft, it being below the bed of the channels C, and the fingers working in slots formed in the bed.

What we claim is—

In a cracker-machine, the combination, with a hopper having series of parallel ways or channels, of a rocking shaft arranged at right angles thereto, and provided with radial fingers for taking into said channels, a sliding rack-bar, and a reciprocating frame, upon which the shaft is mounted, as shown and described, whereby the molded crackers are conveyed or impelled along the channels for delivery to the docking apparatus.

ADAM EXTON.
JOHN EXTON.

Witnesses:
WOODBURY D. HOLT,
MOSES WILSON.